(12) United States Patent
Arenberg et al.

(10) Patent No.: US 7,672,527 B2
(45) Date of Patent: Mar. 2, 2010

(54) METHOD AND APPARATUS FOR CHROMATIC CORRECTION OF FRESNEL LENSES

(75) Inventors: Jonathan W. Arenberg, Santa Monica, CA (US); Amy S. Lo, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1031 days.

(21) Appl. No.: 11/369,027

(22) Filed: Mar. 6, 2006

(65) Prior Publication Data

US 2007/0206181 A1   Sep. 6, 2007

(51) Int. Cl.
*G06K 9/40* (2006.01)
(52) U.S. Cl. .............. 382/255; 382/167; 359/742; 359/743
(58) Field of Classification Search ............... 359/742, 359/743; 382/167, 255
See application file for complete search history.

(56) References Cited

U.S. PATENT DOCUMENTS

| | | | |
|---|---|---|---|
| 4,013,355 A * | 3/1977 | Mailloux | 399/180 |
| 5,081,523 A * | 1/1992 | Frazier | 348/178 |
| 5,094,046 A | 3/1992 | Preiswerk | |
| 5,315,795 A | 5/1994 | Chae et al. | |
| 5,680,145 A | 10/1997 | Thompson et al. | |
| 5,790,242 A * | 8/1998 | Stern et al. | 356/4.04 |
| 5,898,529 A | 4/1999 | Meyer et al. | |
| 6,219,185 B1 | 4/2001 | Hyde | |
| 6,803,554 B2 * | 10/2004 | Ye et al. | 250/208.1 |
| 2002/0063923 A1 * | 5/2002 | Coppeta et al. | 359/124 |

OTHER PUBLICATIONS

Nobuyuki Kitaura, Shiro Ogata, Yuzo Mon; "Spectrometer Employing a Micro -Fresnel Lens", (Feb. 1995); Optical Engineering vol. 34 No. 2, pp. 584-588.*

* cited by examiner

*Primary Examiner*—Bhavesh M Mehta
*Assistant Examiner*—Gregory F Cunningham
(74) *Attorney, Agent, or Firm*—Carmen Patti Law Group, LLC

(57) ABSTRACT

Chromatic correction of a Fresnel lens is effected by collecting data at multiple detectors arrayed along the optical axis of the lens and then digitally processing data from each detector to obtain multiple sets of image data corresponding to selected tuned wavelengths associated with the multiple detectors, or to obtain composite multi-color image data. Digital processing includes deconvolving data from each detector with a point spread function (PSF) associated with the tuned wavelength of the detector, and thereby enhancing the image derived from the detector. Two possible techniques are also disclosed for deriving sub-band signal data having a wavelength that falls between the tuned wavelengths of adjacent detectors.

12 Claims, 3 Drawing Sheets

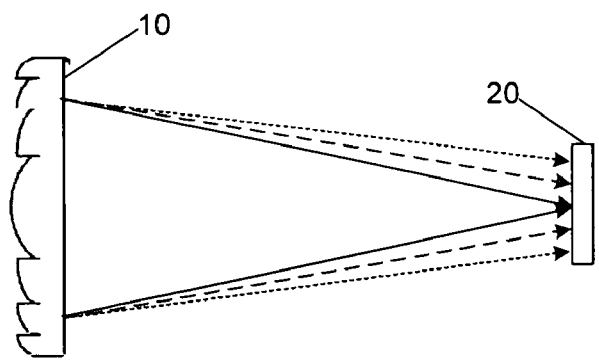
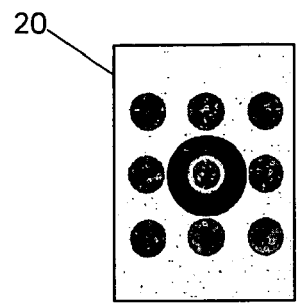
FIG. 6A  FIG. 6B
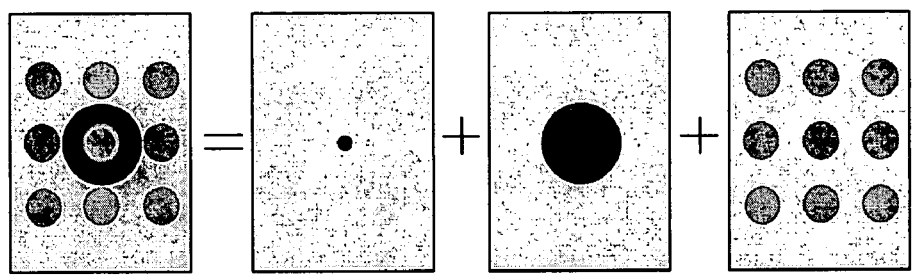
FIG. 7
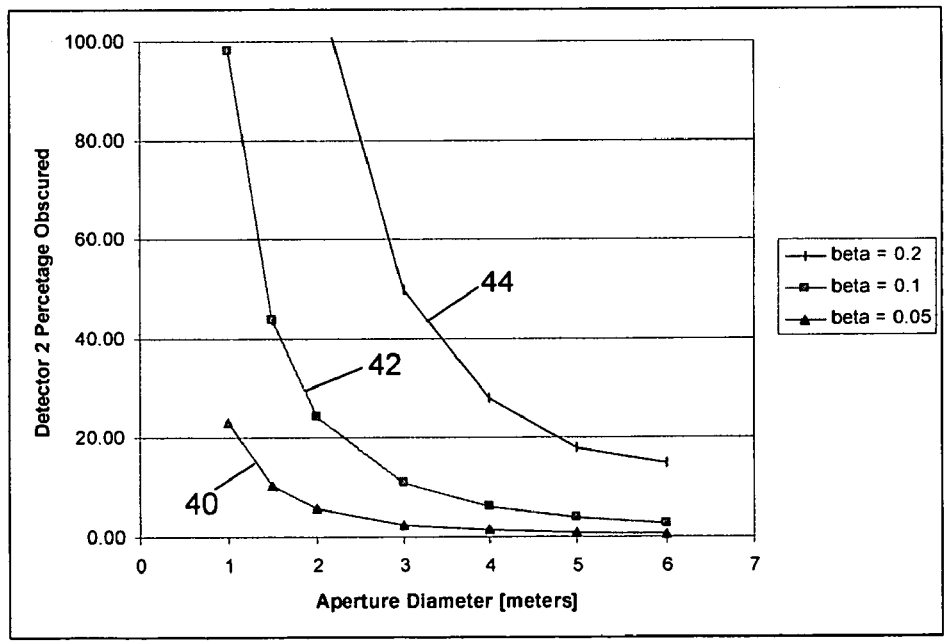
FIG. 8

METHOD AND APPARATUS FOR CHROMATIC CORRECTION OF FRESNEL LENSES

BACKGROUND OF THE INVENTION

This invention relates generally to lenses of the Fresnel type and, more particularly, to techniques for chromatic correction of Fresnel lenses. A Fresnel lens has a relatively thin profile because it consists of multiple, usually annular, sections or zones separated by steps in the thickness that result in a thin profile. For a converging Fresnel lens, each of the zones can be designed to refract parallel light to approximately the same focal point. It is well known that Fresnel lenses are chromatically aberrant. In particular, each wavelength of light is refracted to a different focal point on the optical axis of the lens.

For many applications of Fresnel lenses, such as lighthouse beacons and compact magnifying glasses, chromatic aberrations are of little consequence. There are, however, other important applications of Fresnel lenses where compactness is a desirable advantage but where the ability to image over a large bandwidth is also a requirement. For example, the use of Fresnel lenses as primaries in space-based telescopes has the advantage that a large primary lens can be more easily deployed in space. If such a lens is employed for imaging astronomical or terrestrial objects, chromatic correction is highly desirable in most applications.

It is well known that a Fresnel lens can be chromatically corrected by means of a "reverse" Fresnel lens having the same optical characteristics as the one to be corrected. If the lens to be corrected is a positive lens, as used as a primary telescope optic, the reverse lens is a negative lens having the same focal length. Unfortunately, this technique, usually known as a Schupmann corrector, also requires two additional optical elements. An achromatic convergent lens is needed to bring light from the original Fresnel lens into appropriate focus on the reverse Fresnel lens. Then, because light emerging from the reverse Fresnel lens is divergent, a second conventional convergent lens is needed to focus the light from the reverse lens onto a single focal point. Thus the compactness advantage of using a Fresnel lens is diminished by the need to add a second Fresnel lens and two conventional convergent lenses.

It will be appreciated from the foregoing that there is a need for a more efficient way to provide for chromatic correction of a Fresnel lens, preferably without adding weight and optical complexity. The present invention satisfies this need.

SUMMARY OF THE INVENTION

The present invention resides in a method and apparatus for chromatically correcting output from a Fresnel lens. Briefly, and in general terms, the method comprises the steps of disposing multiple optical detectors at selected distances from the lens, whereby light of different bands of wavelength focus on different ones of the multiple detectors; and processing signals generated by the multiple optical detectors to generate, by deconvolution, output signals representative of images at a specified tuned wavelength for each detector.

The processing step may further comprise combining the output signals from each detector, to provide a composite color image. Alternatively, the multiple output signals derived from the multiple detectors may be output separately for certain applications of the invention.

More specifically, the processing step further comprises generating for each detector a point spread function (PSF) corresponding to the image, formed by the lens, of a point source of a selected wavelength; deconvolving the PSF with image data collected by the detector associated with the PSF; and thereby generating enhanced image data for the detector associated with the PSF.

For the detection of mid-band radiation, the method may further comprise the step of filtering radiation impinging on a selected detector, such that only radiation of desired wavelength band impinges on the detector. Only radiation at the desired wavelength band is then processed in the processing step, to provide sub-band image data.

In accordance with another sub-band signal processing technique, radiation of a second wavelength different from the tuned wavelength impinges on at least one detector; and the method further comprises generating enhanced image data derived from detected radiation at the second wavelength. Specifically, the step of generating enhanced image data derived from detected radiation at the second wavelength comprises generating a Fourier Transform equivalent of image data corresponding to the tuned wavelength detected radiation; subtracting the generated Fourier Transform equivalent of image data from the Fourier Transform of the composite image; and deconvolving the image data obtained in the next preceding step, using a PSF corresponding to the second wavelength, to obtain the enhanced image data corresponding to the second wavelength.

The invention may also be defined in terms of apparatus for chromatically correcting output from a Fresnel lens. Briefly, the apparatus comprises multiple optical detectors disposed at selected focal distances from the lens, whereby light of different bands of wavelength focus on different ones of the multiple detectors; and signal processing means, for processing signals generated by the multiple optical detectors to generate, by deconvolution, output signals representative of images at a specified tuned wavelength for each detector.

The invention may also be defined in terms of an apparatus for chromatic correction. The apparatus comprises an optical detector component, a lens component that comprises a Fresnel lens, and a signal processor. The lens component is configured to direct an optical signal through the Fresnel lens and towards the optical detector component. The optical signal comprises a set of optical signal portions. The lens component is configured to direct each optical signal portion to a different location. Each optical signal portion comprises a different wavelength. The optical detector component is configured to receive the set of optical signal portions and output a corresponding set of image data portions. The signal processor is configured to deconvolute each image data portion with a corresponding point spread function (PSF) for the wavelength of the respective optical signal portion to create a set of output images that correspond to each wavelength of the set of optical signal portions.

It will be appreciated from the foregoing that the present invention represents a significant advance in the field of chromatic correction of Fresnel lenses. In particular, the invention provides color corrected image data without the need for additional and heavy optical elements. Other aspects and advantages of the invention will become apparent from the following more detailed description, taken in conjunction with the accompanying drawings.

BRIEF DESCRIPTION OF THE DRAWINGS

FIG. 6A is a diagram showing how multiple wavelengths of light may impinge on the same detector.

FIG. 6B is diagram of the image at the detector of a point source having multiple wavelengths corresponding to the wavelengths in FIG. 6A.

FIG. 7 is a diagram illustrating superposition of different sub-bands to form the PSF image shown in FIG. 6B.

FIG. 8 is a graph showing the effect of lens aperture diameter and detector width on the percentage of the field of view of one detector obscured by the next adjacent detector.

DETAILED DESCRIPTION OF THE INVENTION

As shown in the accompanying drawings, the present invention is concerned with a technique for correcting chromatic aberration in a Fresnel lens. As is well understood in the art of optics, a Fresnel lens approximates the function of a conventional lens but is formed to comprise multiple sections, usually annular in shape, each of which performs the same function as a correspondingly located annular section of a conventional lens. However, because each section may be of reduced thickness the overall structure has a desirably thin profile and may be fabricated from a relatively thin sheet of plastic material. As is also well understood, a significant shortcoming of Fresnel lenses is that they are inherently chromatically aberrant. In particular a positive or convergent Fresnel lens has a different focal point along the optical axis for each wavelength of light passing through the lens.

Figure 1:
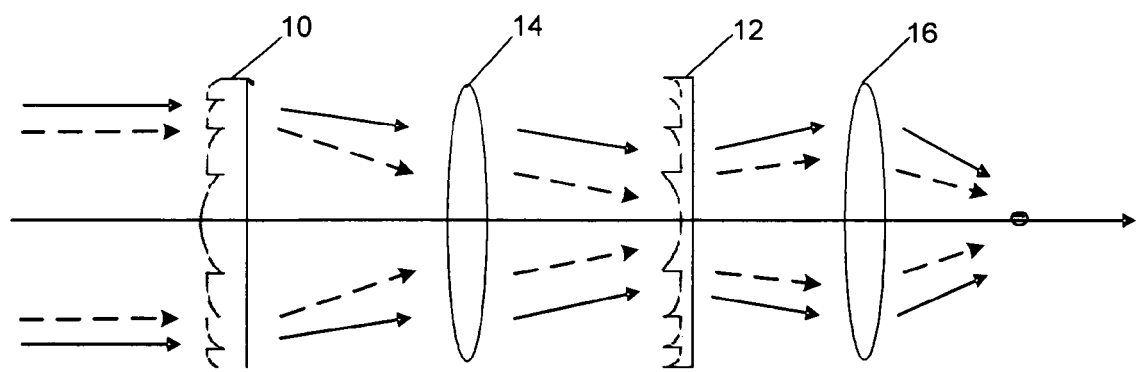
FIG. 1 is a diagram depicting the conventional technique for chromatic correction of a Fresnel lens.

FIG. 1 depicts the conventional technique for chromatic correction of a Fresnel lens 10. By way of illustration, two different wavelengths of light (red and blue) are indicated by solid and broken lines, respectively. It will be noted that, after focusing by the convergent Fresnel lens 10, the red and blue light rays are still slightly divergent with respect to each other, which will result in different focal points for convergence of the individual colors. In the conventional chromatic correction scheme, light from the Fresnel lens 10 is focused onto a reverse Fresnel lens 12 by a convergent achromatic lens 14. Light emerging from the reverse lens 12 is color corrected but the rays pertaining to different colors are rendered mutually divergent. A second additional convergent lens 16 is needed to focus the light to a common focal point on the optical axis. The principal drawback of this technique is the complexity, space and weight associated with adding two extra lenses 14 and 16 to the two Fresnel lenses 10 and 12. The additional convergent lenses 14 and 16 may have to be made with traditional bulky and heavy materials, whereas the Fresnel lenses may be conveniently fabricated from relatively thin plastic sheeting.

Figure 2:
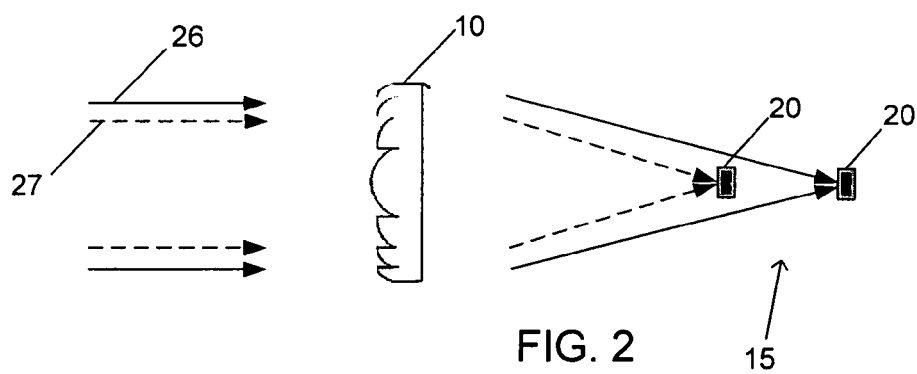
FIG. 2 is a diagram showing the principle of a multiple detector system to collect image data corresponding to multiple wavelengths output from a Fresnel lens.
Figure 3:
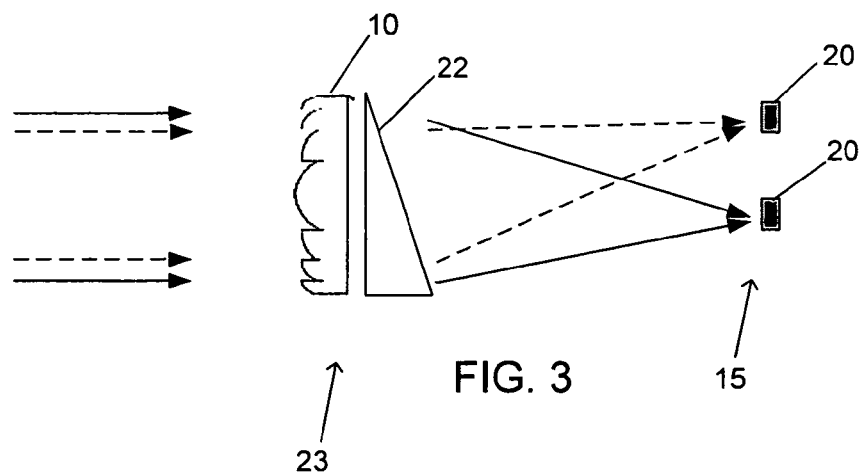
FIG. 3 is a diagram similar to FIG. 2 but in which the multiple detectors are not all arrayed along the optical axis of the lens.

An optical detector component 15 receives light, for example, an optical signal, from the Fresnel lens 10. The optical signal comprises a set of optical signal portions, for example, optical signal portions 26 and 27, where each optical signal portion comprises a different wavelength. Since the focal point for each wavelength received by the Fresnel lens 10 effectively occurs at a different point along the optical axis, one possible technique for chromatic correction is to place detectors 20, of the optical detector component 15, at different locations and capture the light converging at multiple focal points, as depicted in FIGS. 2 and 3. In a simple configuration of this approach, shown in FIG. 2, the detectors 20 are positioned along the optical axis of the lens 10. The principal limitation of this configuration is that each detector 20 necessarily blocks light rays near the axis from reaching detectors further away from the lens 10, so this dictates the use of very small detectors to minimize the blockage effect. Alternatively, light emerging from the Fresnel lens 10 may be angularly dispersed by means of a dispersion lens 22 such as a wedge or prism, as shown in FIG. 3. The dispersion lens 22 spatially separates the wavelengths and allows the detectors 20 to be arrayed off-axis to obviate the blocking effect of having them arrayed along the axis. The drawback to using a dispersion lens 22, or an equivalent arrangement of mirrors (not shown), to deflect light emerging from the Fresnel lens 10 is the complexity added by these optical elements. The Fresnel lens 10 and the dispersion lens 22 in one example comprise portions of a lens component 23.

Figure 4:
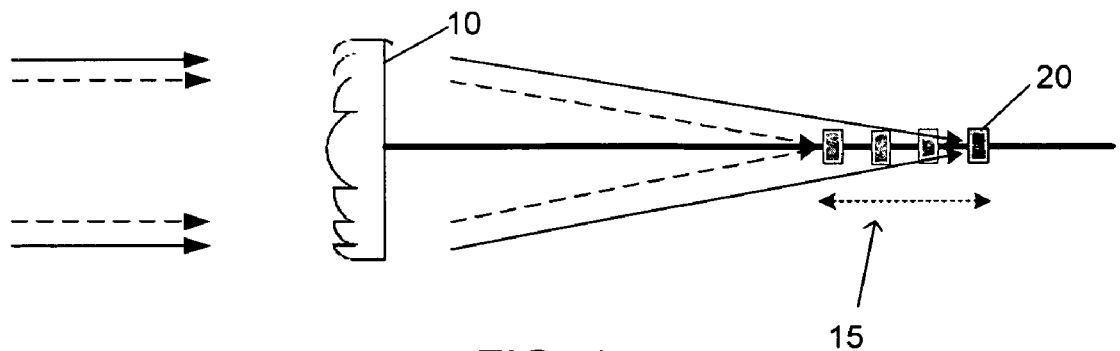
FIG. 4 is a diagram showing the principle of using a single movable detector instead of multiple detectors to collect image data.

Another approach based on the same principle is to use only a single detector 20 that is movable along the optical axis, as depicted in FIG. 4. At each position of the detector 20, a different wavelength is detected. Although this arrangement can, in principle, detect any wavelength over the range of motion of the detector 20, the disadvantages are having to provide for control of the moving parts of the system and in addition having to allow for the fact that the measurements at different wavelengths cannot be taken simultaneously.

Figure 5:
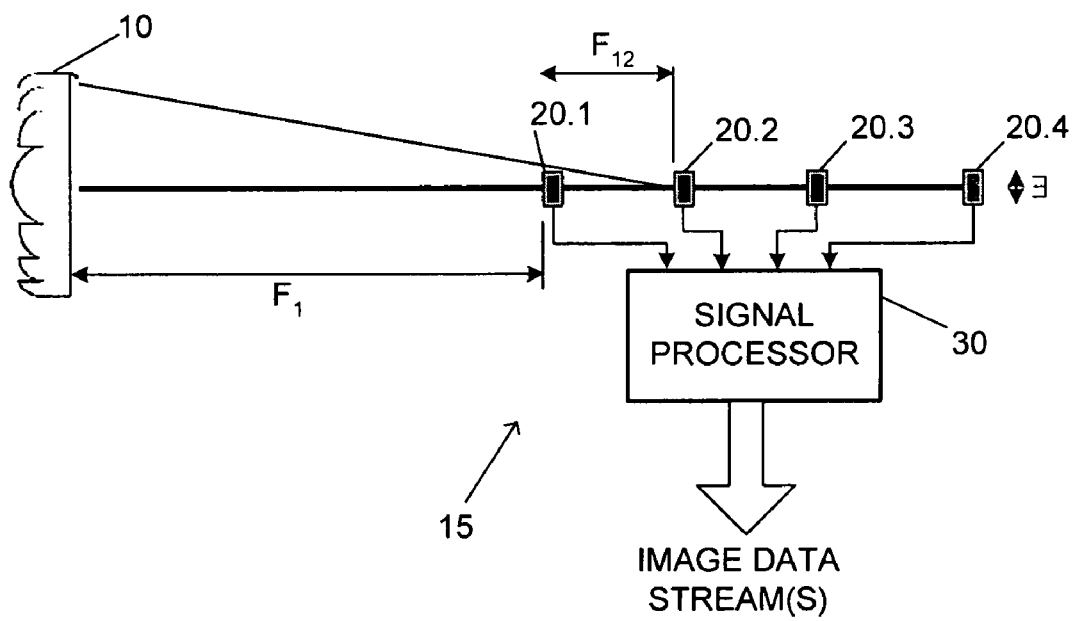
FIG. 5 is a diagram showing the principle of the present invention, in which multiple detectors, of which four are shown, collect image data that are then digitally processed to obtain recovered image data for each of the four detectors.

In accordance with the preferred embodiment of the present invention, chromatic correction is effected by a combination of multiple detectors aligned with the optical axis of the Fresnel lens 10, and post-capture image processing to resolve overlapping wavelengths at each of the detectors. FIG. 5 illustrates this concept implemented with four separate detectors, indicated at 20.1, 20.2, 20.3 and 20.4. For this configuration, the entire visible spectrum from 400 nm to 700 nm wavelength can be imaged by spacing the locating the detectors 20 to observe radiation at wavelengths 80 nm apart. Specifically, the detectors 20.1, 20.2, 20.3 and 20.4 are positioned at the focal points for light at 420 nm, 500 nm, 580 nm, and 660 nm, respectively. By way of further example, for a lens 10 of aperture 2 m in diameter mounted at the end of a boom 28, the four detectors 20.1, 20.2, 20.3 and 20.4 are mounted at distances 12.7 m, 14.5 m, 16.8 m and 20 m, respectively from the lens 10. As indicated by the signal processor 30, image processing is performed on the data captured by the detectors 20, using deconvolution techniques.

It is well known in the optical signal processing art that image definition can be greatly improved by the application of deconvolution algorithms. The term deconvolution is used in optics to refer to the process of reversing optical distortion that takes place in a telescope, microscope or other optical instrument. Optical distortion may be caused by any of various phenomena, one of which is chromatic aberration. Most deconvolution methods assume that the optical path through the telescope or other instrument is optically perfect and that distortion results from convolution with a point spread function (PSF). The PSF is a mathematical function that describes the distortion in terms of the pathways that rays emanating from a theoretical point source of light take through the instrument, or lens in this case. Usually, such a point source contributes a small area of fuzziness to the final image. If the PSF can be determined, deconvolution is a matter of computing the inverse of the PSF and then convolving this inverted function with the acquired image. The result, in theory, is the original undistorted image. In practice, since an infinite number of iterations are theoretically necessary to remove the distortion, the output image is an approximation of the perfect image. Moreover, real optics may have different PSFs at different focal and spatial locations or, as in the present application of deconvolution, the PSF is sensitive to wavelength. Various deconvolution algorithms are used to improve a distorted image by successive iterations of the deconvolution process.

More specifically, the PSF dictates how the power from a point source of radiation is distributed on the image plane. The PSF of a perfect lens forms the Airy function, with a central peak and concentric rings of quickly decreasing magnitude with increasing radius. This describes one "lobe" of the PSF. If we assume that a Fresnel lens is tuned for a specific wavelength, for example, 0.6 microns, the PSF becomes multi-lobed when the wavelength of the incoming radiation is more than ~1 nm away from the tuned wavelength. As the wavelength displacement is increased, the PSF becomes multi-lobed. A multi-lobed PSF essentially means that the telescope is imaging the system with many small lenslets, each with a single airy disk characteristic of the defects of an equivalent single-lobed lens.

The deconvolution process performed in the signal processor 30 uses a pre-calibrated set of PSFs at the desired wavelengths, i.e., one PSF for each of the detectors 20. Each of these PSFs acts like a filter to recover images at the specified frequency or wavelength. The resolution achievable is determined mostly by the number of iterations performed in the deconvolution, and this in turn is limited by the available computing power for a given application of the process. Instead of using pre-calibrated PSFs, reference PSFs can be captured in situ or upon deployment of the optical detector component 15, for example in the form of an imaged point source, such as a bright star.

The theory underlying the use of deconvolution to recover optical images is known in the art. The following text explains the application of that theory to chromatic correction for Fresnel lenses. Acceptable image recovery by digital methods is rendered much more probable if the PSF of the system is well characterized. One way to grade the quality of a PSF of the optical system is by the Strehl ratio, which is the ratio of the intensity of light at the image peak divided by the intensity of light at a Gaussian (ideal) peak. For a perfect lens, this ratio would be unity. Normal optical systems have ratios around 0.9, and any system having a Strehl less than 0.9 generally produces unacceptable distortion in the resultant images.

Unfortunately, Fresnel lenses are very chromatically aberrant and the PSF wavelength tolerance is very poor. If a fast Fresnel lens, with f number f/8, for example, is tuned at 0.7 microns, the bandwidth where the image is focused is very small. (The f number is a lens characteristic defined as the ratio of its focal length F to its diameter D.)

The maximum amplitude of the optical path difference (OPD) gives the focal length shift, $$\Delta W = -\frac{\Delta F}{8f/\#},$$

where f/# is the f number (F/D) and $\Delta F$ is the focal length difference, which is given by:

$$\Delta F = \frac{D^2}{8N}\left(\frac{1}{\lambda_R} - \frac{1}{\lambda_c}\right),$$

where N is the number of zones in the Fresnel lens and $\lambda_R$ and $\lambda_c$ are two different wavelengths.

The wavelength difference represented by $\Delta F$ is given by:

$$\Delta\lambda = \lambda_R - \lambda_c = \frac{\lambda_R}{\left(1 - \frac{D^2}{\Delta F \lambda_R 8N}\right)}.$$

As mentioned above, so long as $\Delta\lambda$ is less than about 1 nm the PSF is single-lobed. As the magnitude of $\Delta\lambda$ increases, the PSF becomes increasingly multi-lobed and is said to be degraded, as indicated by successively smaller values of the Strehl ratio as $\Delta\lambda$ increases. However, tests have shown that an acceptable degree of image recovery can be obtained by deconvolution when the PSF has a wavelength displacement $\Delta\lambda$ of 8.7 nm. A less desirable, but still acceptable, degree of image recovery is possible when the PSF wavelength displacement $\Delta\lambda$ is as high as 37 nm. Even when $\Delta\lambda$ is as high as 100 nm, some image recovery is possible. Other key variables that affect the quality of the recovered image are the number of pixels provided by the observed image and the number of pixels used to represent the PSF. With more image pixels the computing time for deconvolution is longer but the contrast of the recovered image is improved.

In its basic mode of operation, the present invention provides recovered image data for each of four wavelengths to which the detectors 20 are tuned. Depending on the application of the lens, image processing can be used to produce a composite color image, by combining the signals developed for each of the detectors 20, or multiple images at the individual tuned wavelength bands.

In an alternate mode of operation, the invention also has the capability of providing "sub-band" image data. One way of obtaining the sub-band data is by means of a filter placed in front of one or more of the detectors 20. Each filter is selected to transmit only a frequency sub-band of interest. With the filter in place, the system can be used to recover image data at any selected wavelength.

In accordance with another aspect of the invention, sub-band information is recovered without use of a filter. This technique makes use of the property that the image formed by the tuned wavelength is focused and, therefore, represents higher frequency information in Fourier space. Removing this high frequency information leaves the low frequency information, which is mostly composed of the images formed at the un-tuned wavelengths. FIG. 6A shows the concept of multiple wavelengths (three for example) falling on a single detector 20. As shown in FIG. 6B, the image of a point source at the detector 20, in other words the PSF image, has a composite form derived from the multiple wavelengths. As further depicted in FIG. 7, the three components of the composite PSF include a small-diameter single lobe corresponding to the tuned wavelength, a larger diameter single lobe corresponding to a first wavelength different from the tuned wavelength, and multiple lobes corresponding to a second wavelength that is even further de-tuned than the first wavelength.

More specifically, this aspect of the invention involves the steps of first recovering image data corresponding to a selected tuned wavelength associated with a detector that receives radiation at multiple wavelengths, transforming the recovered image data at the tuned wavelength to Fourier space data, and then obtaining a composite PSF based on multiple wavelengths of radiation. The method of the invention then subtracts the Fourier space data corresponding to the tuned wavelength from a composite data image to obtain an image that is enhanced with respect to a second wavelength different from the tuned wavelength. Finally, this enhanced image is deconvolved using a PSF based on the second wavelength, to obtain an enhanced image based on the second wavelength.

The primary limit to the system is the size of the detector 20. The second, third and fourth detectors (20.2, 20.3 and 20.4) have views of the lens aperture that are obstructed by the detector that is immediately adjacent and located toward the lens. Therefore, either small detectors or small pick-off mirrors (not shown) need to be placed at every detector position except the last. In the example system where D=2 m and L=20 m, if a 5-cm detector 20.1 is used, the second detector 20.2 will see a 6% obstruction of the aperture.

The ratio of the obscured region, $\epsilon$, is then:

$$\varepsilon_j = \frac{G_j^2}{\pi\left(\frac{D}{2}\right)^2}, \text{ where } G_j = \frac{\beta F_j}{F_{ij} - \beta},$$

and where $G_j$ is the apparent width of the first detector as viewed from the second detector in relation to the lens aperture diameter D, and $\beta$ is the actual width of the detector measured in the same length units as D and F. Nominally, the acceptable percentage of obscured area has a practical upper limit of around 8%. For a detector 20.1 with one square side having length 5 cm, the ratio is given in FIG. 8 as a function of the first focal length (i.e. the focal length of the closest detector 20.1) and the diameter of the lens 10. It will be observed that for a 5-cm detector size, as shown by curve 40, the percentage obscured for the second detector 20.2 is below 10% if the lens diameter is 2 m or greater. For a 10-cm detector size, as shown by curve 42, the lens diameter must be increased to 3 m or greater to achieve the same result. For an even larger detector size of 20 cm, as indicated by curve 44, obscured percentages below 10% cannot be achieved without using an impractically large lens.

A simpler expression for the percentage obscured by the next adjacent detector 20.1 is:

$$\%\_\text{obscured} \propto \frac{\beta}{D^2 F}.$$

It will be appreciated from the foregoing that the present invention represents a significant advance in the field of chromatic correction for large Fresnel lenses. In particular, chromatic correction is achieved without the need for additional optical elements, by a combination of multiple detectors arrayed along the optical axis and digital processing to recover images from the data collected at each detector. The invention also provides a way of detecting sub-band wavelengths, i.e., wavelengths falling between the tuned wavelengths of the individual detectors. It will also be appreciated that although specific embodiments of the invention have been described by way of illustration, various modifications may be made without departing from the spirit and scope of the invention. Accordingly, the invention should not be limited except as by the appended claims.

The invention claimed is:

1. A method for chromatically correcting output images from a Fresnel lens, comprising:
    disposing multiple optical image detectors at selected focal distances from the lens, whereby light of different bands of wavelength focus on different ones of the multiple image detectors; and
    processing signals generated by the multiple optical image detectors to generate, by deconvolution, output signals representative of chromatically corrected images at a specified tuned wavelength for each image detector.

2. A method as defined in claim 1, wherein the processing step further comprises:
    generating for each image detector a point spread function (PSF) corresponding to the chromatically corrected image, formed by the lens, of a point source of a selected wavelength;
    deconvolving the PSF with image data collected by the image detector associated with the PSF; and
    thereby generating enhanced image data for the image detector associated with the PSF.

3. A method as defined in claim 1, and further comprising:
    filtering radiation impinging on a selected image detector, such that only radiation of desired wavelength band, falling outside the tuned wavelength, impinges on the image detector;
    wherein only radiation at the desired wavelength band is processed in the processing step, to provide sub-band image data.

4. A method as defined in claim 1, wherein the processing step further comprises combining the output signals from each image detector, to provide a composite, color, chromatically corrected image.

5. A method as defined in claim 4, wherein:
    radiation of a second wavelength different from the tuned wavelength impinges on at least one image detector; and
    the method further comprises generating enhanced image data derived from detected radiation at the second wavelength.

6. A method as defined in claim 5, wherein the step of generating enhanced image data derived from detected radiation at the second wavelength comprises:
    generating a Fourier Transform equivalent of image data corresponding to the timed wavelength detected radiation;
    subtracting the generated Fourier Transform equivalent of image data from a Fourier Transform of the composite, color, chromatically corrected image; and
    deconvolving the image data obtained in the preceding step, using a PSF corresponding to image data received at the second wavelength, to obtain the enhanced image data corresponding to the second wavelength.

7. An apparatus far chromatically correcting output from a Fresnel lens, comprising:
    multiple optical image detectors disposed at selected distances from the lens, whereby light of different bands of wavelength focus on different ones of the multiple image detectors; and
    signal processing means, for processing signals generated by the multiple optical image detectors to generate, by deconvolution, output signals representative of chromatically corrected images at a specified tuned wavelength for each image detector.

8. An apparatus as defined in claim 7, wherein the signal processing means further comprises means for combining the output signals from each image detector, to provide a composite, color, chromatically corrected image.

9. An apparatus as defined in claim 7, wherein the signal processing means further comprises:
    means for generating for each image detector a paint spread function (PSF) corresponding to the chromatically corrected image, formed by the lens, of a point source of a selected wavelength;

means for deconvolving the PSF with image data collected by the image detector associated with the PSF; and whereby the means for deconvolving generates enhanced image data for the image detector associated with the PSF.

10. An apparatus as defined in claim 7, and further comprising:

a color filter, for filtering radiation impinging on a selected image detector, such that only radiation of desired wavelength band impinges on the image detector;

wherein only radiation at the desired wavelength band is processed in the signal processing means, to provide sub-band image data.

11. An apparatus as defined in claim 7, wherein:

radiation of a second wavelength different from the tuned wavelength impinges on at least one image detector; and the apparatus further comprises means for generating enhanced image data derived from detected radiation at the second wavelength.

12. An apparatus as defined in claim 11, wherein the means for generating enhanced image data derived from detected radiation at the second wavelength comprises:

means for generating a Fourier Transform equivalent of image data corresponding to the tuned wavelength detected radiation;

means for subtracting the generated Fourier Transform equivalent of image data from a Fourier Transform of the composite, color, chromatically corrected image; and means for deconvolving the image data obtained in the preceding step, using a PSF corresponding to the second wavelength, to obtain the enhanced image data corresponding to the second wavelength.

\* \* \* \* \*